L. L. HAWORTH.
Joints for Check-Row Cords.

No. 155,024. Patented Sept. 15, 1874.

WITNESSES:
Chas. Nida
Sedgwick

INVENTOR:
L. L. Haworth
BY
Munn & Co
ATTORNEYS.

UNITED STATES PATENT OFFICE.

LYSANDER L. HAWORTH, OF LONDON, OHIO.

IMPROVEMENT IN JOINTS FOR CHECK-ROW CORDS.

Specification forming part of Letters Patent No. 155,024, dated September 15, 1874; application filed May 23, 1874.

*To all whom it may concern:*

Figure 1:
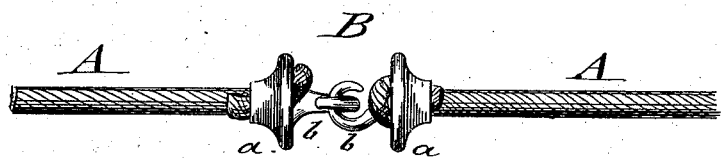
Figure 2:
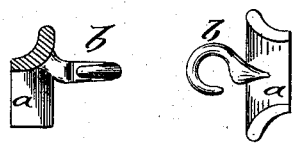
Figure 3:
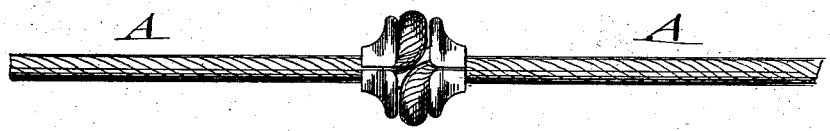
Figure 4:
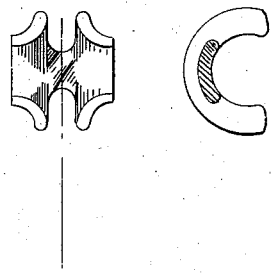

Be it known that I, LYSANDER L. HAWORTH, of London, Madison county, Ohio, have invented a new and Improved Joint for Check-Row Cords, of which the following is a specification:

In the accompanying drawing, Figure 1 represents a side view of my improved joint for check-row cords. Fig. 2, detail section and side views of the same before being applied to the cord; and Figs. 3 and 4 show side and detail views of single metallic check-row stop.

Similar letters of reference indicate corresponding parts.

The object of my invention is to provide a joint for check-row cords used for dropping devices in corn-planters, so that the cord can be readily unhooked and passed around trees, and be hooked again without requiring the changing of the corn-planting implement, or the position of the cord across the field.

This device is especially useful in fields in which stumps are still standing, as it saves the farmer considerable time in adjusting the check-row cord.

My invention consists of a metallic bell-shaped sleeve or ring with projecting hook, which is jointed to the connecting-hook, while the sleeve is firmly closed or clinched on the loop-shaped cord end, after passing the same around the hook.

In the drawing, A represents the check-row cord, which is for the purpose of greater convenience and adjustability made of several parts, instead of being in one continuous piece, and the single stops shown in Figs. 3 and 4, and heretofore patented by me under date of September 19, 1871. The several cord-pieces are connected as required, by hook-joints B, attached to the ends of the same. Each hook-joint B is made of two separate rings or sleeves, $a$, of bell shape, for operating also as stop to the corn-planting device, being provided with projecting hooks $b$ at the inside of the sleeves, as shown in Figs. 1 and 2. The hooks $b$ are made in such a manner that they are easily connected and detached when placed in the required position, but do not separate when passing through the corn-planter and the pulleys. The cord end is placed in the shape of a loop around the base of hook $b$, and its sleeve or ring then closed by suitable machinery around the loop end, so that a rigid attachment of sleeve and cord is produced. The hooks are then joined and the cord is ready for use, the joint being adapted to serve as stop, and as connecting and detaching device for any part of the check-cord.

Having thus described my invention, I claim as new and desire to secure by Letters Patent—

The joint for check-row cords, consisting of metallic rings or sleeves with projecting hooks applied around the loop-shaped ends of the check-cord pieces, and connected in the manner substantially as specified and described.

LYSANDER L. HAWORTH.

Witnesses:
JAMES COULTER,
Z. F. GRAHAM.